Oct. 25, 1938.   H. F. JOHNSTONE   2,134,481
PROCESS OF REMOVING SULPHUR DIOXIDE FROM WASTE GASES
Filed Dec. 23, 1935
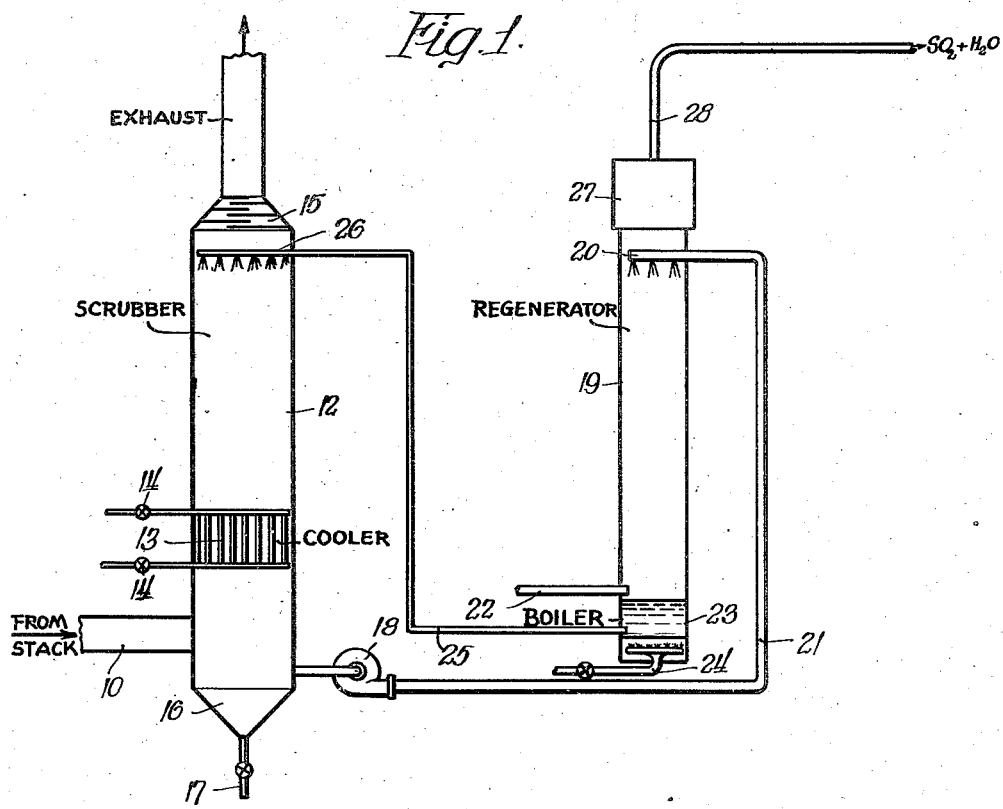
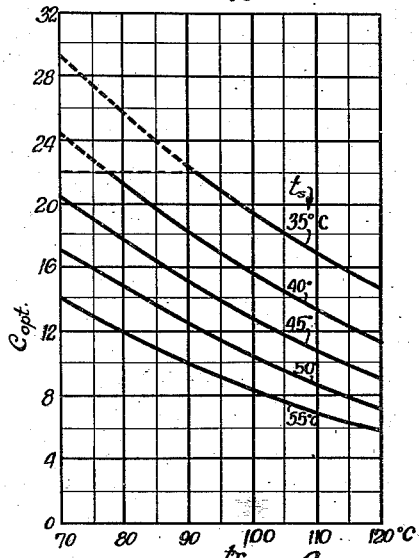
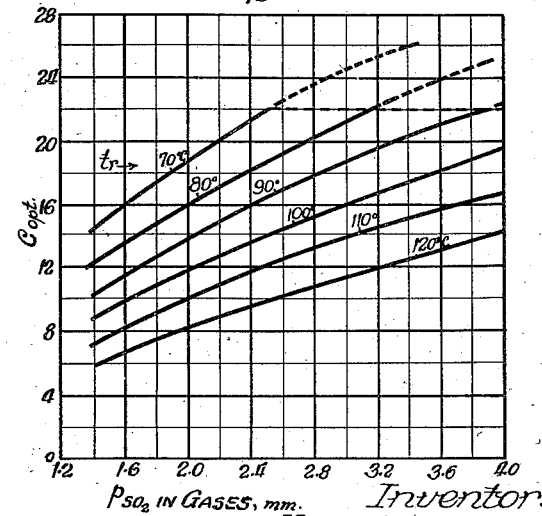
Inventor:
Henry F. Johnstone Patented Oct. 25, 1938

2,134,481

UNITED STATES PATENT OFFICE 2,134,481

PROCESS OF REMOVING SULPHUR DIOXIDE FROM WASTE GASES

Henry F. Johnstone, Urbana, Ill., assignor, by mesne assignments, to Commonwealth Edison Company, Chicago, Ill., a corporation of Illinois Application December 23, 1935, Serial No. 55,713

1 Claim. (Cl. 23—178)

This invention relates to a process of removing and recovering sulphur dioxide from gases containing the same, and more particularly is directed to removing and recovering sulphur dioxide from waste gases, such as boiler and furnace gases containing a relatively small percentage of sulphur dioxide, by a cyclic regenerative process, although the process is not limited to these particular types of waste gases.

It has become a problem of increasing importance in recent years to prevent escape of sulphur dioxide from flue gases, smelter gases and the like into the surrounding atmosphere, due to the formation of sulphuric acid by the oxidation of the sulphur dioxide followed by combination with water vapor in the air.

A number of methods of obviating this problem have been developed, but the cost of such methods has usually been prohibitive of their widespread adoption, and the recovery of by-products of any substantial commercial value has been insufficient to cover the operating costs of the process.

One method of removing and recovering sulphur dioxide from waste products has been described briefly in my copending application, Serial No. 665,337, filed April 10, 1933, now Patent No. 2,082,006, and consists briefly of a cyclic process involving the washing of gases containing relatively small percentages of sulphur dioxide in a scrubber or absorber with an extracting solution capable of absorbing sulphur dioxide from these gases at a low temperature, and liberating the absorbed sulphur dioxide in a regeneration step by heating, whereupon the regenerated solution is then returned for further absorption of sulphur dioxide from the gases. The extracting solution employed may comprise ammonium sulphite and ammonium bisulphite.

I have found that the efficiency of the process is greatly increased if the concentration of the extracting solution is accurately controlled in accordance with the concentration of the sulphur dioxide in the gases being treated, the efficiency of the scrubber, the temperature of the extracting solution leaving the scrubber, the temperature of regeneration and the efficiency of the regenerator. This control gives an optimum concentration of solution for various operating conditions, and results in producing the greatest absorption capacity in the solution while requiring the least quantity of steam per pound of sulphur dioxide recovered in the regeneration process, and thus imparts to the process an efficiency capable of reducing its operating cost considerably with respect to the quantity of sulphur dioxide recovered from the gases.

One object of the present invention is to provide a process in which the optimum concentration of the extracting solution is predetermined and controlled to produce the greatest absorption capacity and reduce the cost of liberation of the absorbed sulphur dioxide.

Another advantage of the present invention is the control of the concentration of the extracting solution in accordance with variations in the factors controlling the operating conditions under which the process is carried out, to insure the most efficient concentration under any operating conditions which may be encountered.

I have found also that the composition of the gas bears a direct relationship to the optimum concentration of solution employed, depending on the regenerating temperature of the solution. From these relationships and the efficiency of the scrubber and regenerator, I have been able to determine the optimum concentration of the solution as these operating conditions vary, thereby providing for most efficient operation of the solution.

Another feature of the present invention is the reduction of these various relationships to a single mathematical equation relating these operating conditions to the optimum concentration of solutions so that for any given set of operating conditions the desired concentration can be readily determined.

Other objects and advantages of the present invention will appear more fully from the following detailed description which, taken in conjunction with the accompanying drawing, will disclose to those skilled in the art the particular manner of carrying out a preferred form of the present invention.

In the drawing—

Figure 1 is a diagrammatic view of the cycle of operation of the process disclosed in the present invention;

Figure 2 is a graphical illustration of the relationship between certain of the factors affecting the concentration of the solution; and Figure 3 is a similar graphical illustration of additional relationships occurring according to the teachings of the present invention.

The cycle of operation of the process is shown diagrammatically in Figure 1, and follows a cyclic system comprising absorption at a low temperature and regeneration, or removal of the sulphur dioxide from the absorbing solution, by stripping of this solution with steam at a temperature near the normal boiling point of the solution, depending upon whether a vacuum or pressure above atmospheric pressure is employed.

The extracting solution in a preferred embodiment of the invention is one containing ammonium sulphite and ammonium bisulphite. However, the method of determining the optimum concentration is general, and other equations could be developed for other systems such as those using sodium sulphite and sodium bisulphite. In this latter case, however, the limiting concentration fixed by the solubility of the salts would be different and much lower than that for the ammonia system.

Following the flow cycle diagrammatically shown in Fig. 1, the waste gases from a boiler, furnace or other gas producing structure are passed from the stack through the conduit 10 into the lower portion of an absorber 12. These gases may first be precooled before entrance into the absorber by a spray washer, which effects the removal of dust particles, although not materially affecting the subsequent treatment of the gases. A suitable cooler 13 is employed within the absorber, having control valves 14 connected thereto for controlling the amount of cooling effected thereby, in order to control the temperature of the absorbing solution leaving the scrubber 12, which scrubber contains any suitable type of absorbing surfaces which are suitable for handling large quantities of gas at low draft loss and will give the fastest rate of transfer of the sulphur dioxide under a low diffusion gradient.

The purpose of the cooler 13 is to have the solution leaving the scrubbing surfaces in contact with the entering raw gas at as low a temperature as is possible from the standpoint of the cost of construction and operation. For flue gases containing approximately three-tenths per cent sulphur dioxide (by volume) at a temperature of 150° C., and having a humidity of 0.045 pound water per pound of dry gas, the exit temperature of the solution should be approximately 45° C., which is, in fact, a few degrees below the wet bulb temperature of the gases.

The gases leave the top of the scrubber through an eliminator 15, which prevents the loss of the extractor or scrubbing solution therethrough.

The extracting solution leaving the bottom of the scrubber first passes through a settling tank which removes most of the suspended solids, the tank being indicated at 16 and being connected with a suitable drain 17, and the liquor or solution then passes through the pump 18 which forces it through suitable heat exchangers (not shown) to the top of the regenerating column 19 where it is discharged downwardly from suitable distributing means 20 connected to the conduit 21. The column 19 is provided with surfaces which give contact between vapors and liquor. In this case, however, the quantity of vapor is small compared with that of the original gas, and the draft loss, or frictional resistance, may be considerably larger than that permissible for the scrubber.

The regenerator 19 is a device employed for separating the sulphur dioxide from the liquor, and should produce as high a concentration of this gas as possible. The stripping of the liquor may be accomplished either by steam alone, or by steam in combination with another chemical. When steam is used, it may be introduced directly into the bottom of the regenerator 19, either above the surface of the liquid or below its surface and bubbling up through it, through suitable steam conduit 22, or it may be generated in an evaporator 23 which is heated in any suitable manner, as by the burner 24.

The regenerated liquor, called the extractor, leaves the boiling pot through the conduit 25, and is then preferably pumped through the hot side of any suitable heat exchanger which may be connected between the conduits 21 and 25, being cooled by this heat exchanger, which reduces its temperature to approximately the temperature of the solution leaving the scrubber through the pump 18. The liquor which has been regenerated and passed through the conduit 25 enters the top of the scrubber through proper distributing devices 26.

The vapors which leave the top of the regenerating column 19 contain a small percentage of ammonia, which is removed in an ammonia scrubber 27. This scrubber preferably contains a relatively small area of absorbing surface which is wet by water, or preferably by condensate obtained in the removal of the water vapor from the sulphur dioxide. The ammonia scrubber per se forms no part of the present invention, and for a description of its operation reference should be had to the copending application of myself and Alamjit D. Singh, Serial No. 97,550, filed August 24, 1936. In either case, the ammonia reacts rapidly with any dissolved sulphur dioxide, and, since the partial pressure of sulphur dioxide in the vapor is much higher than that of the ammonia, the solution is very acidic and the absorption of the ammonia is complete. The vapors leaving the ammonia scrubber may pass directly to a suitable condenser for removing water from the sulphur dioxide, leaving the latter in a concentrated and substantially pure state, or, for economy of steam, they may pass first to a compressor. In either case, the sulphur dioxide and moisture is passed outwardly of the scrubber 27 through the conduit 28, and the recovery of sulphur dioxide in a substantially pure state by a subsequent operation is not believed necessary of detailed description herein. The liquid removed from the ammonia scrubber and the water removed from the sulphur dioxide, or an equivalent amount of make-up water is returned to the system.

The present invention concerns itself particularly with the provision of an optimum concentration in the extracting solution which enters the scrubber 12 through the distributing devices 26. In the use of such an ammonium sulphite-bisulphite process, it has been found that in the treatment of gases containing approximately 6% sulphur dioxide, where the absorption temperature is maintained approximately 25 degrees C., the concentration should be approximately 100 to 200 grams per liter of ammonium sulphite, and approximately 700 to 800 grams per liter of ammonium bisulphite. This corresponds to approximately 22.4 moles ammonia per 100 moles $H_2O$ and 17.5 moles $SO_2$ per 100 moles $H_2O$.

I have found, however, that for dilute gases, containing 0.5% sulphur dioxide or less, especially when the temperature of absorption is about 35° C., the quantity of steam required for regeneration is considerably less when a less concentrated solution is employed. Furthermore, the capacity of the solution, expressed in pounds of sulphur dioxide recovered per pound of extracting solution employed, is at a maximum when the concentration of ammonia is below 22 moles per 100 moles of water. The optimum concentration for these two important factors in the operation of the process, I have found, approximately coincides. It has become evident, in my examination of this phenomenon, that the value of the optimum concentration varies from one condition of operation to another. At least five operating conditions must be considered, namely, the temperature of absorption, the temperature of regeneration, the concentration of sulphur dioxide in the raw gases, and the efficiency of the scrubber and regenerator.

I have found that it is possible to obtain an approximate mathematical equation for the maximum in the capacity-ammonia concentration curve on the basis of two fundamental equations relating the vapor pressures of sulphur dioxide and ammonia to the composition of the solution. The equations have been found to be valid for all conditions of operation likely to be encountered. These equations are:

$$P_{SO_2} = M \frac{(2S-C)^2}{C-S}$$

$$P_{NH_3} = N \frac{C(C-S)}{2S-C}$$

where $P$ is the vapor pressure of the corresponding component in millimeters of mercury, $S$ is the concentration of sulphur dioxide in the solution, expressed as moles per 100 moles of water, $C$ is the concentration of ammonia in the solution, in the same unit, $M$ and $N$ are constants which depend only on the temperature of the solution, as follows:

$$\log M = 5.865 - \frac{2369}{T}$$

$$\log N = 13.680 - \frac{4987}{T}$$

and $T$ is the temperature in degrees Kelvin.

If the vapor pressure of sulphur dioxide over the solution leaving the scrubber is substantially equal to the partial pressure of sulphur dioxide in the raw gas, i. e., the scrubber is operated at 100% efficiency, and the regenerator is operated so that as much $SO_2$ is removed from the solution as is possible, the equation for the capacity of the solution becomes:

$$\text{capacity} = \frac{800[\sqrt{a^2 + 8aC} - C(0.696 + 0.0175 t_r) - a]}{1800 + 0.14 t_r C + 54.6C}$$

where $a$ is the ratio of the partial pressure of sulphur dioxide in equilibrium with the solution leaving the scrubber to the constant $M$ at the temperature of absorption and $t_r$ is the temperature of regeneration in degrees centigrade. The parameter $a$ includes the efficiency of the scrubber, the concentration of the gas and the temperature of absorption, the latter being designated below as $t_s$.

The maximum in this equation corresponds closely to the optimum concentration of ammonia desired. By the use of calculus, the maximum may be related to the operating conditions as follows:

$$\left[ \frac{7200 - 0.14 a t_r - 54.6a - C_{max}(0.56 t_r + 218.4)}{1250 + 31.5 t_r - 0.14 a t_r - 54.6a} \right]^2 = 1 + \frac{8 C_{max}}{a}$$

The following table shows different values of $C_{max}$ for several conditions for gases containing 0.3% sulphur dioxide, based on the assumption that the scrubber operates at 100% efficiency, i. e., the vapor pressure of sulphur dioxide in equilibrium with the solution leaving the scrubber is equal to the partial pressure of the sulphur dioxide in the raw gases entering the scrubber.

TABLE I

Optimum concentrations of ammonia for gases containing 0.3% $SO_2$ (by volume)

| $t_r$ | $t_s = 35°$ C. | $t_s = 40$ | $t_s = 45$ | $t_s = 50$ | $t_s = 55$ |
|---|---|---|---|---|---|
| MOLES OF AMMONIA PER 100 MOLES OF WATER | | | | | |
| 70 | 28.8 | 24.3 | 20.4 | 17.1 | 14.0 |
| 80 | 25.7 | 21.2 | 17.7 | 14.7 | 12.0 |
| 90 | 22.4 | 18.5 | 15.2 | 12.5 | 10.2 |
| 100 | 19.4 | 15.9 | 13.0 | 10.4 | 8.6 |
| 110 | 16.8 | 13.6 | 10.9 | 9.0 | 7.1 |
| 120 | 14.2 | 11.3 | 9.0 | 7.3 | 5.8 |

The optimum concentration of ammonia decreases as the absorption temperature increases, decreases as the regeneration temperature increases, increases as the sulphur dioxide concentration of the gas increases, and increases as the efficiency of the scrubber increases the saturation of the solution. It should be emphasized, however, that the optimum concentrations for most conditions are not sharp and that practically the same results can be obtained with concentrations within a range of 10% of the optimum.

As a typical example of the application of my invention to the process when the gases contain approximately 0.3% sulphur dioxide, with an absorption temperature of approximately 45° C. and a regenerating temperature of approximately 100° C., I have found that the optimum concentration of ammonia in the solution giving the most efficient and economical operation lies somewhere within the range of 11 to 14 moles of ammonia per 100 moles of water, whereas Table I shows that the calculated optimum concentration is approximately 13.0 moles.

Finally, it is to be recognized that there must be an upper limit of the concentration, determined by the solubility of the ammonium salts. This has been found to exist at approximately $C = 22$ moles per 100 moles of water. Above this concentration, the calculated optimum value of $C$ is meaningless. As a general rule, therefore, for low temperatures of absorption and high concentrations of sulphur dioxide, such as are likely to obtain in the recovery of sulphur dioxide from dry smelter gases, the preferred value of $C$ would be approximately 22. However, for boiler furnace gases containing up to .5% sulphur dioxide and for which the absorption temperature is fixed at 35° C. or above, a definite advantage can be derived by utilizing the optimum concentration of ammonia, determined as hereinbefore described.

In Figure 2 of the drawing I have disclosed a graph of the values which show the effect of the temperature of absorption and of regeneration on the optimum value of $C$. Since the constant $a$ is directly proportional to the concentration of sulphur dioxide in the gases, it is possible to show the effect of changing the gas composition. This is shown in Figure 3 in which the absorption temperature is maintained at 45° C.

Referring again to Fig. 2, the abscissae of this graph are the regeneration temperatures in degrees centigrade, ranging from 70 degrees to 120 degrees. The ordinates represent the optimum concentration of ammonia in moles per 100 moles of water, ranging from zero to 32 moles. The values shown in Table I for the various absorption temperatures are plotted in Figure 2 and represent the relationship existing between the optimum concentration of ammonia desired and various absorption temperatures and regeneration temperatures. For example, when the absorption temperature is 35 degrees C. and the regeneration temperature is only 70 degrees C., a molecular concentration of ammonia of the order of 29 moles is indicated, but since the solubility of the salts indicates a definite upper limit of 22 moles, for all values indicated as above 22 moles, the 22 mole concentration is considered optimum. The concentration decreases rapidly as the regeneration temperature is increased, being approximately 14½ moles at a regeneration temperature of 120 degrees. It will be apparent that the lowest molecular concentration is required when the absorption temperature and regeneration temperature are relatively high.

It will be apparent, from the curves shown in Figure 2, that the optimum concentration of ammonia in the scrubbing solution for scrubbing raw gases containing approximately 0.3% sulphur dioxide by volume varies from about 14.5 moles to 22 moles per 100 moles of water for variations in the temperature of regeneration from 70° C. to 120° C. for a temperature of absorption of about 35° C. These various ranges of optimum concentrations of ammonia as indicated by these curves are set forth in the following table:

| Temperature of absorption | Concentration of ammonia in moles per 100 moles of water |
| --- | --- |
| °C. | |
| 35 | 14.5 to 22. |
| 40 | 11.5 to 22. |
| 45 | 9 to 20.5. |
| 50 | 7 to 17. |
| 55 | 6 to 14. |

In Figure 3, the absorption temperature is maintained at 45 degrees C., and the curves illustrate the effect of the concentration of sulphur dioxide in the original gases at various regeneration temperatures running from 70 degrees to 120 degrees, respectively, in steps of 10 degrees based on the assumption that the scrubber operates at 100% efficiency. The ordinates again represent the maximum or optimum concentrations of ammonia in moles per 100 moles of water, while the abscissae represent the partial pressure of sulphur dioxide in the gases in millimeters of mercury. It will thus be seen that with a constant absorption temperature, the optimum concentration of ammonia increases as the partial pressure of sulphur dioxide in the gases increases, and that for various constant relationships between the absorption and regenerating temperature, the concentration of the solution must be increased with increases in the percentage of sulphur dioxide present in the gases. These relationships are shown in the formula or equation which gives the optimum concentration of ammonia under various conditions of temperature, efficiency of the apparatus, and percentage of sulphur dioxide in the raw gases to be treated.

The curves shown in Figure 3 indicate that the optimum concentration of ammonia in the scrubbing solution for absorbing at a temperature of about 45° C. sulphur dioxide from raw gases in which the partial pressure of the sulphur dioxide varies from about 1.4 to 2.5 millimeters of mercury, ranges from about 14.5 moles to 22 moles per 100 moles of water for a regeneration temperature of about 70° C. These various ranges of optimum concentrations of ammonia as indicated by these curves are set forth in the following table:

| Partial pressure in millimeters | Temperature of regeneration | Concentration of ammonia in moles per 100 moles of water |
| --- | --- | --- |
| | °C. | |
| 1.4 to 2.5 | 70 | 14.5 to 22. |
| 1.4 to 3.1 | 80 | 12.5 to 22. |
| 1.4 to 3.9 | 90 | 10.5 to 22. |
| 1.4 to 4.0 | 100 | 9 to 19.5. |
| 1.4 to 4.0 | 110 | 7 to 17. |
| 1.4 to 4.0 | 120 | 6 to 14. |

From the data and the known relationship between the various factors affecting the operating conditions, I am able to provide an extracting solution which is capable of recovering the greatest quantity of sulphur dioxide per pound of extracting solution employed. This materially aids in reducing the operating cost of the equipment, and also in reducing the cost of recovering the sulphur dioxide. In addition, it provides for maintaining the concentration of the extracting solution at an optimum quantity in accordance with the various factors affecting the operation of the process, resulting in the use of a solution which is most economical under such operating conditions.

It will be readily apparent that in the operation of a process of this type, in which continuous cyclic operation is effected, certain of the operating conditions can be controlled so as to remain substantially constant. Thus, by proper control of cooler 13, with a known incoming temperature of the gases, the absorption temperature can be maintained substantially constant, and consequently the optimum concentration of the solution can be determined in accordance with the concentration of sulphur dioxide in the gases and the regenerating temperatures. Similarly, other of the factors might be maintained constant and the concentration varied in accordance with variations in the absorption temperature, as determined by the equation giving maximum optimum concentration for any set of operating conditions.

While I have disclosed a method of determining the optimum concentration of the solution in accordance with variations in factors affecting the operating conditions, it is to be understood that the present invention also contemplates a reversal of that procedure. I have found, for example, that it may be more efficient to change some of the operating conditions to fit the ammonia concentration. Thus the temperature of the solution leaving the scrubber may be varied by varying the amount of cooling effected by coil 13, as the concentration of the sulphur dioxide in the gases changes. Likewise, it may be desirable to vary the temperature of regeneration in accordance with variations in the temperature of absorption and/or concentration of sulphur dioxide in the gases. With such control, the concentration of the solution would still be optimum with respect to the operating factors, and greatest efficiency thereby produced.

I am aware that the present method of obtaining optimum concentrations of the solution in accordance with the various factors affecting operating conditions may be capable of modification and change, and I do not intend to limit my disclosure except as defined by the scope and spirit of the appended claim.

I claim:

The method of recovering sulphur dioxide from gases containing approximately 0.3% sulphur dioxide which comprises passing said gases into contact with an aqueous solution of ammonium sulphite and ammonium bisulphite at substantially 45° C. and containing not less than 11 nor more than 14 moles of ammonia per 100 moles of water, subsequently heating said solution to 100° C. to liberate said sulphur dioxide, and returning said regenerated solution for contact with said gases.

HENRY F. JOHNSTONE.